UNITED STATES PATENT OFFICE.

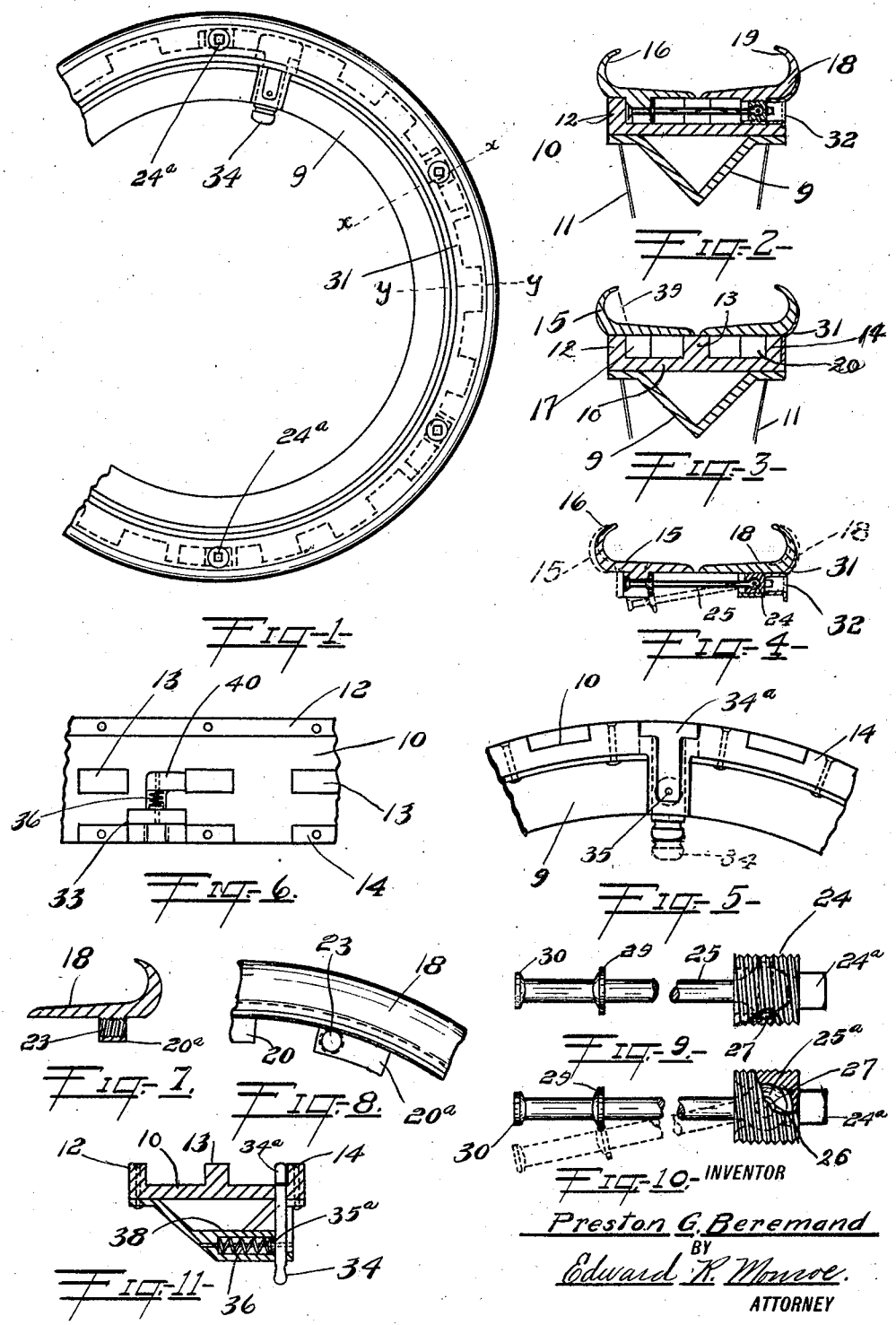

PRESTON G. BEREMAND, OF BAY CITY, MICHIGAN.

SECTIONAL WHEEL-RIM.

1,341,877.     Specification of Letters Patent.     Patented June 1, 1920.

Application filed November 30, 1917. Serial No. 204,683.

*To all whom it may concern:*

Be it known that I, PRESTON G. BEREMAND, a citizen of the United States of America, residing at Bay City, in the county of Bay and State of Michigan, have invented certain new and useful Improvements in Sectional Wheel-Rims, of which the following is a specification.

This invention relates to an improvement in sectional wheel rims for penumatic tires.

The primary object of the invention is to provide a rim construction which may be quickly and easily disassembled for the removal of the tire and which, when in use, will securely support the tire.

A further object of the invention is to provide a rim construction in which the assembling and disassembling of the parts may be effected with a minimum manipulation of the securing devices.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit, or sacrificing any of the advantages of the invention.

In the drawings:

Figure 1 is an elevation of the rim, a portion being broken away;

Fig. 2 is a section taken transversely through the rim on the line $x$—$x$ of Fig. 1;

Fig. 3 is a section taken on the line $y$—$y$ of Fig. 1;

Fig. 4 is a section of the tire retaining members showing the retaining bolt in position by full lines, and also showing (in dotted lines) the bolt swung down when removing the tire, or placing it in position;

Fig. 5 is a fragmentary view showing the locking means in position;

Fig. 6 is a plan of the same;

Fig. 7 is a section of one of the rim sections;

Fig. 8 is a side elevation of the same;

Fig. 9 is an enlarged detail of the retaining bolt and head;

Fig. 10 is a side elevation of the same; and

Fig. 11 is a section showing the locking means in position on the rim.

Referring now to the drawings, the numeral 10 indicates the annular member constituting a fixed rim, which is riveted or otherwise secured to the V-shaped annular member 9 and to which the spokes 11 are secured. While wire spokes have been illustrated as attached to the fixed rim 10, it will be understood that any type of spoke may be used, or my improved rim may be used on a disk wheel to equal advantage. The fixed rim and the devices carried by the same may be applied to a wheel of any structure on which it may be desired to use the same.

At one edge of the fixed rim 10 is formed an upstanding annular continuous rib 12, and in the center and at the opposite edge of the rim are the upstanding lugs 13 and 14. A tire engaging section 15 is provided which is substantially one-half the width of the fixed rim 10, and which is formed with a curved flange 16 disposed to engage the bead of the tire. The under face of this section 15 is provided with the spaced lugs 17, which when the member 15 is locked in position on the fixed rim 10, as illustrated in Figs. 2 and 3, it is held securely in position between the upstanding rib 12 and the lugs 13 of the fixed rim 10, which will prevent transverse movement of these sections on the fixed rim 10.

A second tire engaging section 18 is provided, which is of substantially the same configuration as the member 15, the same being provided with a curved flange 19 engaging the bead of the tire. The under face of the member 18 is also provided with a series of spaced lugs 20 which are of the same length as the lugs 14 of the fixed rim 10, excepting the lugs wherein the retaining attachment is housed, these being considerably longer to allow for easy manipulation thereof.

As will be noted in Fig. 8, the lugs $20^a$ of the member 18 are provided with the openings 23, which are threaded to receive the threaded member 24, said member having at its one end the squared head $24^a$, its other end having an opening into which is introduced the bolt member 25, the head $25^a$ of which is enlarged as shown and provided with the opening 26. After said bolt member is inserted in the opening in the member 24, the pin member 27 is inserted or driven through suitable openings in the member 24 and through the opening in the head $25^a$ of the bolt 25 and it will therefore be obvious that said bolt is free to swivel two ways within the member 24, the head 25ª having a groove or ridge across the head 25ª in order that the operator may know when the bolt is in position to swivel and drop out of its seat.

The retaining bolt 25 is provided at its opposite end with the lugs 29 and 30, the lug 29 being of larger diameter than the lug 30, in order that it may ride on the face of the member 10 when assembling or disassembling the rim, these lugs are slightly dished as shown, and when in position are disposed on each side of the lug members 17 of the member 15, said lugs being provided with seats for same, and which is simply to facilitate the holding of the bolt in position when the sections are loose.

In order that mud and other foreign matter may not enter the openings through which the lugs must pass when the rim is assembled and disassembled, I provide the cover plate 31 which can be welded or suitably bolted to the tire retaining section 18, the member 10 having its one face slightly grooved in order that the member 31 may fit into same and the member 10 thus present a smooth appearance, it is also provided with the necessary openings 32 to allow for the insertion of a wrench on the head 24ª when it is necessary to remove the tire or tighten the retaining sections.

In assembling the rim, one edge of the tire is placed in position on the section 15, the other edge in position on the member 18, the retaining bolts are then placed in position in the seats provided in the lugs 17 of the section 15, the lugs 20 and 20ª are then placed so that they register with the openings between the lugs 14 on the member 10, and the whole is forced onto the rim until the lugs 17 butt against the continuous rim member 12. The members 15 and 18 on which are contained the tire are then rotated until the lugs 20 are behind the lugs 14, and a wrench is then applied to the squared head of the member 24 which naturally forces the members 15 and 18 from each other (as shown in Fig. 4) and against the rim member 12 and the lugs 14, the tire valve being free to move in the slot 40 of the rim 10.

Inasmuch as the lugs 20ª are slightly longer than the lugs 20 and of which I prefer to use six, the opening 23 is not concealed after the tire and tire retaining section has been rotated and the operator applies the wrench as desired. To accommodate the quick detachable tires having plane side faces, I provide an extra ring 39 which is clearly shown in Fig. 3 (dotted lines).

The fixed rim 10 is also provided with an opening 33 in which is disposed to operate the key member 34, said key member being held in position by means of the housing 38 and the small pin member 35 which has an annular flange member 35ª which is disposed to butt against the pin, being held in this position by the coil spring 36 which is positioned thereon.

The key as shown securely fits the space between the lugs 20 and thus prevents further rotation of the tire retaining sections with relation to the fixed rim 10, and, when it is desired to remove a tire the operator forces the pin 35 inwardly by the aid of a small pointed tool thus allowing the key to assume the position as clearly shown in dotted lines in Fig. 5, said key having an enlarged shoulder 34ª which of course, limits the distance the key may drop, the operator next loosens the retaining bolt 25, the tire retaining sections are then rotated until the lugs register with the openings between the lugs of the fixed rim 10 when the tire retaining sections can be easily removed and the tire removed from the same.

From the above description, it will therefore be obvious that I have perfected a simple and inexpensive rim which can be quickly and easily assembled and which will owing to the means for positively affecting a lateral movement of the rim sections eliminate the general trouble resulting from tires rusting to the rim as is the case with the rims now on the market. The inner and outer lugs 13 and 14 form an intervening annular groove and the lugs 14 which are arranged in spaced relation provide a recessed outer flange corresponding to the recessed flange shown in my prior copending application No. 185,460.

What I claim is:

1. In tire supporting means, similar sections, and fastening means connecting said sections and having pivotal and screw thread connection with one of the sections and detachable connection with the remaining section.

2. Tire supporting means comprising similar sections provided with lugs, one of the sections having certain lugs formed with screw thread openings, members disposed within the screw thread openings and having threaded engagement therewith, and bolts having pivotal connection with the screw thread members and adapted to make detachable connection with the remaining section.

3. Tire supporting means comprising similar sections, bolts having pivotal connection with one of said sections and provided at their free ends with lugs, and the remaining section having projecting parts to be engaged by the lugs of the bolts, and means for adjusting the bolts longitudinally.

4. In combination, an annular member provided at one side with an outer flange and having spaced lugs at its opposite side and intermediate its sides, sections mounted upon the annular member and provided with lugs to pass through the spaces formed between the lugs of the annular member and to be engaged therewith upon turning the sections upon the annular member, certain lugs of one of the sections being longer than the remaining lugs and formed near one end with transverse internally threaded openings, members threaded into such openings and bolts having pivotal connection with the threaded members and adapted to make detachable connection with the lugs of the remaining section.

5. Tire supporting means comprising similar sections, each of the sections formed with lugs and certain lugs of one of the sections having transversely internally threaded openings, members threaded into said openings and bolts pivotally connected with the threaded members and having spaced lugs at their free ends having their opposing sides made convex.

6. Tire supporting means comprising an annular member provided at one side with an annular flange and having a plurality of spaced lugs at the opposite side, similar tire receiving sections adapted to be mounted upon the annular member and provided with spaced lugs of a size to pass through the spaces between the lugs of the said annular member and to be carried in the rear of the same by a rotary movement of the tire receiving sections, and a guard carried by the tire supporting means and provided with lugs adapted to extend across the spaces between the lugs of the annular member to exclude foreign matter from such spaces.

7. In a wheel, comprising a fixed rim having an outwardly extending flange at one side and an annular groove in its outer face near its opposite side, the outer wall of such groove being notched at regular intervals, a flange adapted to slip upon the fixed rim and provided with a rabbet to receive the outer flange of the fixed rim, a second flange provided upon its inner face with lugs in position to register with the notches in the outer wall of the fixed rim to pass through such notches into the annular groove and engage in the rear of the parts separated by said notches, and locking means mounted upon the wheel and adapted to engage the flange provided with lugs to secure the same against rotation upon the fixed rim.

8. In a wheel, comprising a fixed rim having an outwardly extending flange at one side and an annular groove in its outer face near its opposite side, the outer wall of such groove being notched at regular intervals, a flange adapted to slip upon the fixed rim and provided with a rabbet to receive the outer flange of the fixed rim, a second flange provided upon its inner face with lugs in position to register with the notches in the outer wall of the fixed rim to pass through such notches into the annular groove and engage in the rear of the parts separated by said notches, locking means mounted upon the wheel and adapted to engage the flange provided with lugs to secure the same against rotation upon the fixed rim, said locking means comprising a lock bolt to engage the flange, and locking means co-acting with the lock bolt to retain the latter in locking engagement with the flange.

9. In a wheel, comprising a fixed rim having an outwardly extending flange at one side and an annular groove in its outer face near its opposite side, the outer wall of such groove being notched at regular intervals, a flange adapted to slip upon the fixed rim and provided with a rabbet to receive the outer flange of the fixed rim, a second flange provided upon its inner face with lugs in position to register with the notches in the outer wall of the fixed rim to pass through such notches into the annular groove and engage in the rear of the parts separated by said notches, locking means mounted upon the wheel and adapted to engage the flange provided with lugs to secure the same against rotation upon the fixed rim, said locking means comprising a lock bolt to engage the flange, locking means co-acting with the lock bolt to retain the latter in locking engagement with the flange, said locking means consisting of a radially movable lock bolt mounted in guides upon the wheel, and a transversely movable spring actuated lock pin suitably incased and adapted to engage the lock bolt.

In testimony whereof I affix my signature.

PRESTON G. BEREMAND.